United States Patent
Jackson, Jr.

(10) Patent No.: US 7,891,926 B2
(45) Date of Patent: Feb. 22, 2011

(54) FASTENER

(75) Inventor: Nicholas Jackson, Jr., Davisburg, MI (US)

(73) Assignee: A. Raymond, Inc., Rochester Hills, MI (US)

( * ) Notice: Subject to any disclaimer, the term of this patent is extended or adjusted under 35 U.S.C. 154(b) by 416 days.

(21) Appl. No.: 12/020,837

(22) Filed: Jan. 28, 2008

(65) Prior Publication Data

US 2009/0191025 A1 Jul. 30, 2009

(51) Int. Cl.
*F16B 19/00* (2006.01)
(52) U.S. Cl. ........................... 411/510; 411/913
(58) Field of Classification Search ......... 411/508–510, 411/913; 24/297, 453
See application file for complete search history.

(56) References Cited

U.S. PATENT DOCUMENTS

| | | | |
|---|---|---|---|
| 2,909,957 A * | 10/1959 | Rapata ........................ 411/508 |
| 3,481,242 A | 12/1969 | Topf |
| 3,627,362 A * | 12/1971 | Brenneman ................. 52/586.2 |
| 4,392,278 A * | 7/1983 | Mugglestone ................. 24/614 |
| 4,551,189 A | 11/1985 | Peterson |
| 4,580,964 A | 4/1986 | Repella |
| D293,880 S * | 1/1988 | Takahashi ..................... D8/354 |
| 5,236,431 A * | 8/1993 | Gogolewski et al. ........ 606/139 |
| 5,368,261 A | 11/1994 | Caveney et al. |
| 5,672,038 A | 9/1997 | Eaton |
| 5,694,666 A * | 12/1997 | Hamamoto ................... 24/297 |
| 5,813,810 A | 9/1998 | Izume |
| 5,829,937 A | 11/1998 | Morello et al. |
| 5,851,097 A * | 12/1998 | Shereyk et al. .............. 411/508 |
| 5,906,465 A | 5/1999 | Sato et al. |
| 5,907,891 A | 6/1999 | Meyer |
| 5,921,510 A | 7/1999 | Benoit et al. |
| 6,203,364 B1 | 3/2001 | Chupak et al. |
| 6,206,331 B1 | 3/2001 | Keith et al. |
| 6,449,776 B1 * | 9/2002 | Musal ........................... 2/418 |
| 6,449,814 B1 * | 9/2002 | Dinsmore et al. ............. 24/297 |
| D467,161 S | 12/2002 | Klenck et al. |
| 6,536,718 B2 | 3/2003 | Benito-Navazo |
| 6,669,426 B1 | 12/2003 | Detter et al. |
| 6,719,513 B1 | 4/2004 | Moutousis et al. |
| 2006/0239796 A1 | 10/2006 | Franks |

* cited by examiner

*Primary Examiner*—Flemming Saether
(74) *Attorney, Agent, or Firm*—Dickinson Wright PLLC

(57) ABSTRACT

A fastener having a shank with a moveable portion that improves insertion of the fastener into an aperture, as well as improves the retention of the fastener within the aperture and the resistance of the fastener to extraction.

20 Claims, 3 Drawing Sheets

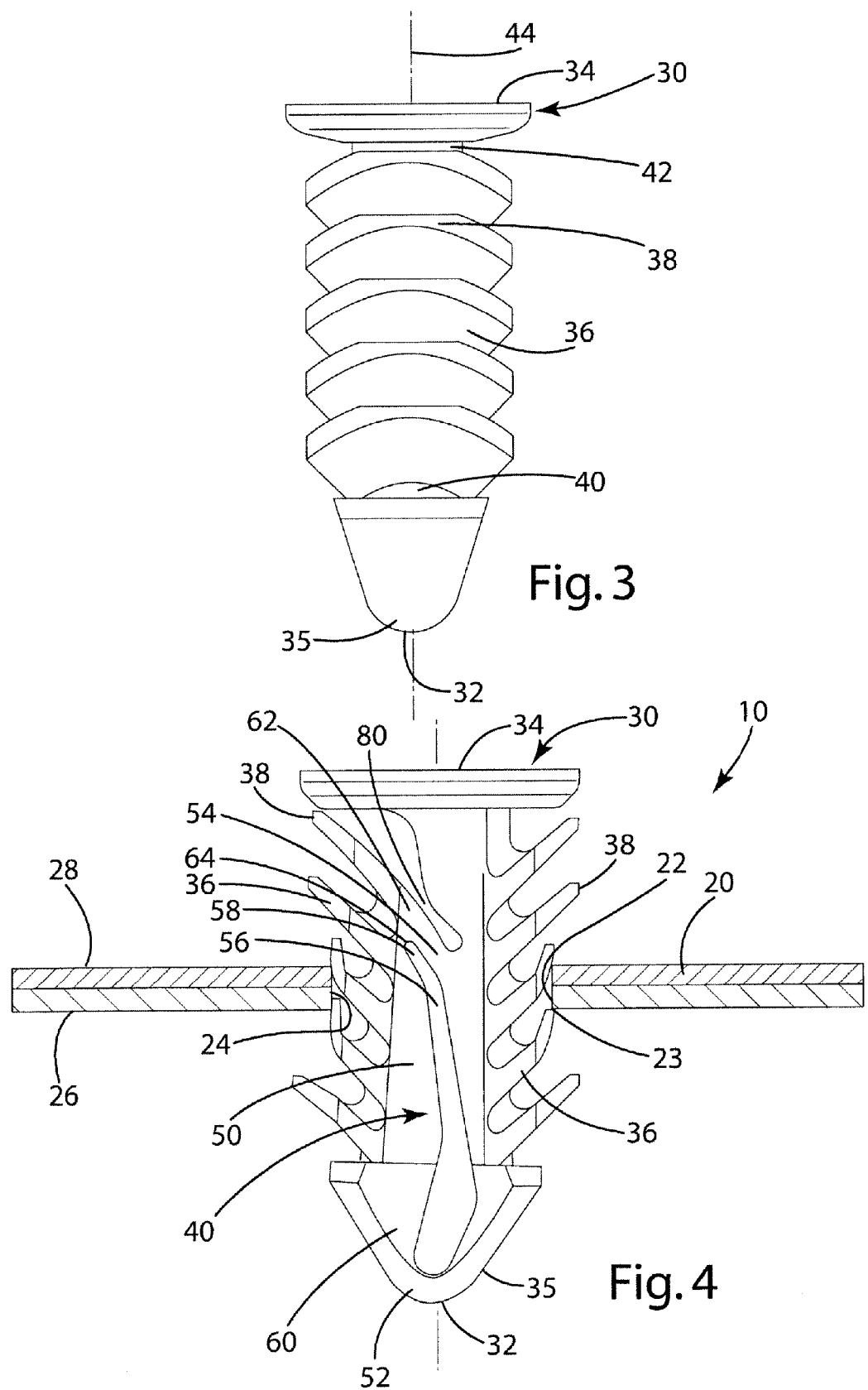

FASTENER

BACKGROUND OF THE INVENTION

1. Technical Field

This present invention is directed to a fastener assembly and, more particularly, a fastener having a moveable portion that improves insertion of the fastener into an aperture, as well as improves the retention of the fastener within the aperture.

2. Discussion

A wide range of fasteners exist for securing a first member to a second member. The first member is typically a base member, such as a vehicle frame or body having an aperture for receiving the shank of the fastener. The second member may be any object capable of being secured to the base member, such as a door panel, electrical wiring, and hoses.

The fastener typically includes a head assembly useful in connection with securing two members together. For example, if a door panel is to be secured to the vehicle body, a flat head assembly may be used. To secure an elongated object such as electrical wiring to the base member, a clip head assembly may be used for retaining, routing, and bundling elongated objects. The head assembly may also be configured to have multiple functions such as assembling two members together while also retaining an elongated object.

A fastener must be easily inserted into an aperture yet sufficiently resistant to extraction. Typically, fasteners include a solid shank from which arcuate fins extend upwardly. These arcuate fins generally allow for easy insertion through an aperture having a smaller diameter than the outer diameter of the fins in a normal position as the fins compress upward and inward as they are inserted thereby reducing their diameter. The arcuate fins are also designed to resist extraction after insertion by expanding outwardly from the normal position while maintaining engagement of the underside of the member having the aperture. Many patents have been filed on various designs, shapes, and configurations of these fins, each one attempting to provide for easier insertion while improving the retention force and the resistance to removal of the fastener from the aperture. In some embodiments, the design of fins alone does not provide enough retention force, ease of insertion, or the desired combination of insertion force and resistance to extraction. Therefore, it is desirable to have a fastener that may utilize any configuration of fins while yet allowing easier insertion into an aperture combined with a greater retention force. It is also desirable to allow for a fastener using any configuration of fins to be inserted into an aperture having a smaller diameter then it was previously capable of.

Another problem with fasteners is that manufacturing tolerances of the fastener, or more particularly of the aperture into which the fastener is inserted may vary. In some instances, manufacturing tolerances may allow unintended release of the fastener or for the fastener to loosen. Therefore, it is desirable for a fastener to be capable of maintaining engagement within an aperture across a broader range of manufacturing tolerances than was previously possible.

SUMMARY OF THE INVENTION

In view of the above, the present invention relates to a fastener assembly, more particularly to a fastener assembly allowing for easier insertion as well as greater retention force and resistance to removal.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

FIG. 3 is a side elevational view of the fastener;

FIG. 4 is a front elevational view of the fastener being inserted into an aperture;

DETAILED DESCRIPTION OF THE PREFERRED EMBODIMENT

Figure 5:
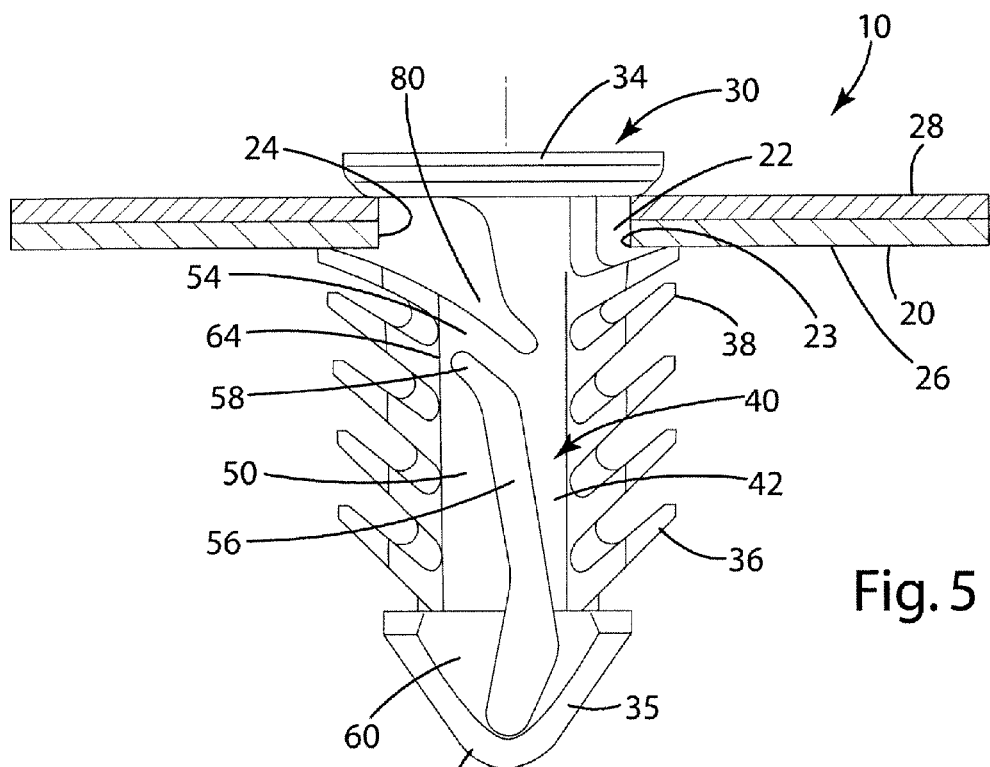
FIG. 5 illustrates the fastener in a normal position while being retained within an aperture.
Figure 6:
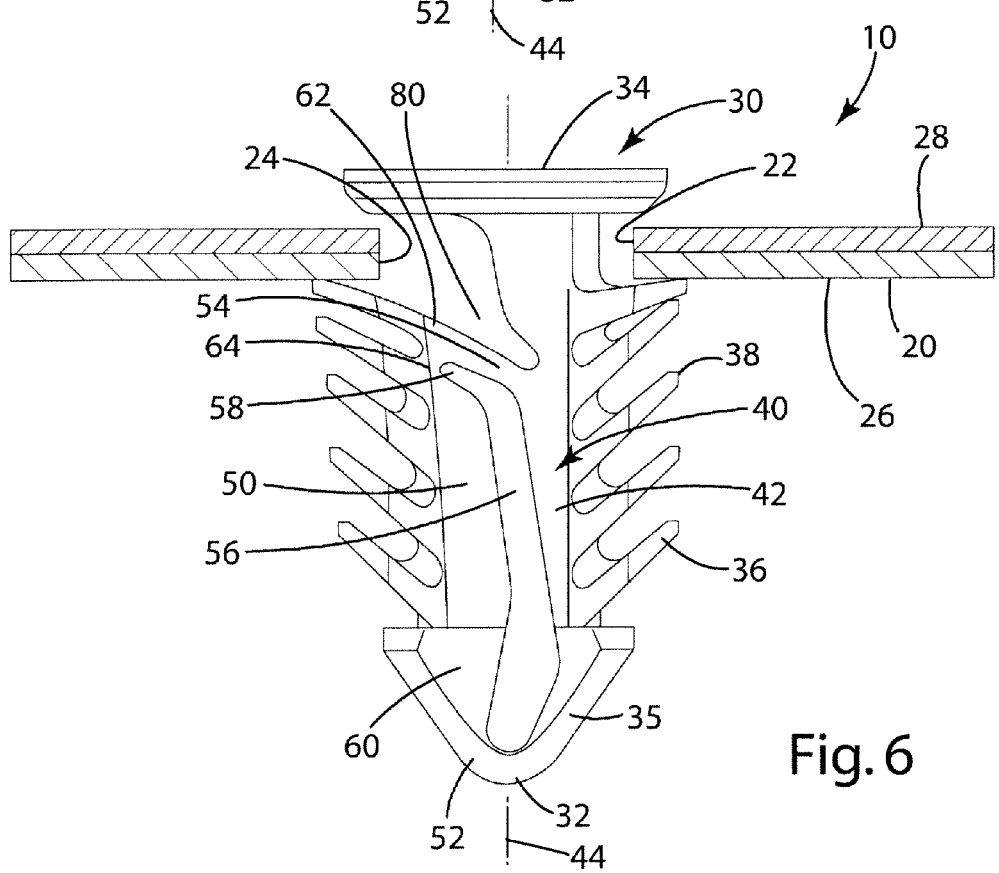
FIG. 6 illustrates a fastener resisting extraction from an aperture.

The fastener assembly 10 is generally illustrated in FIGS. 4-6 as including a fastener 30 attached to a member 20. The fastener 30 may include exemplary head assemblies (not illustrated) configured to couple different components such as wires, hoses, cables, and any other desired items to the member 20 or another member, such as a door panel, to the member 20.

As illustrated in FIGS. 4-6, the member 20 defines an aperture 22 having an inner surface 24. The inner surface 24 generally has a diameter and is typically shaped as a circle, but other shapes and configurations may be used. The member 20 further includes a first surface or lower surface 26 and a second surface or upper surface 28. The member 20 may be any member having an aperture 22 such as a steel panel or body panel of a vehicle.

Figures 1, 2:
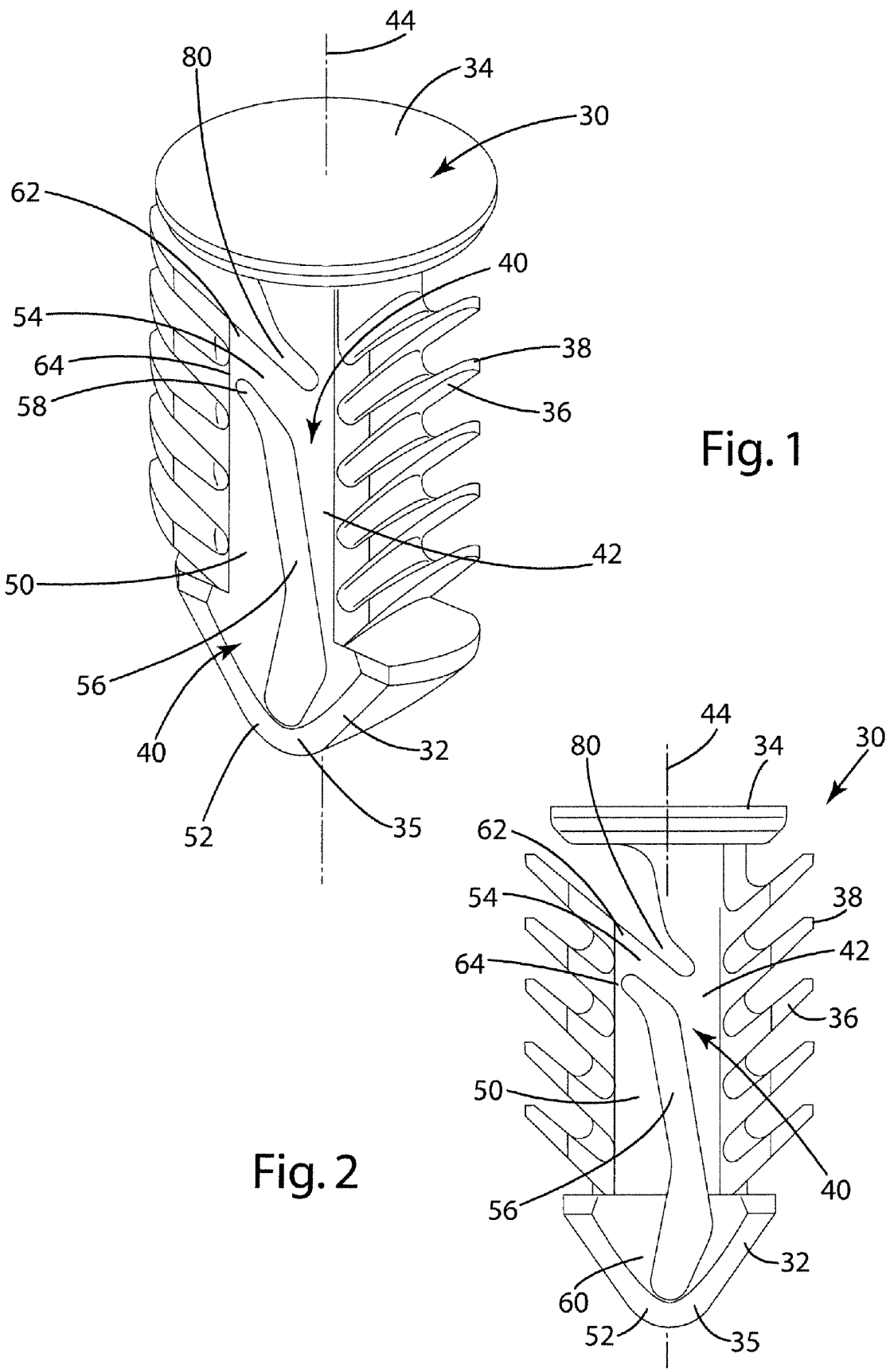
FIG. 1 is a perspective view of the fastener including an exemplary insertion member, fins, and head.
FIG. 2 is a front elevational view of the fastener.

As illustrated in FIGS. 1-3, the fastener 30 includes a shank 40 having a first end or insertion end 32 and a second end 34. The first end 32 is generally configured to be inserted into the aperture 22. The first end 32 may have any desired size, shape or configuration to allow for easy insertion into the aperture 22. The second end 34 is generally attached to a head assembly (not illustrated). The second end 34 may also have any desired size, shape, or configuration.

A shank 40 having a longitudinal axis 44 extends between the first end 32 and second end 34. The shank 40 may be formed with any size, shape, or configuration but is generally formed to work in conjunction with the size and shape of the desired aperture 22 to allow for insertion and resistance to removal of the shank 40 from the aperture 22. The shank 40 generally includes fins 36. These fins 36 are commonly arcuate fins having an outside diameter, however, square fins, rectangular fins, and other sizes, shapes, and configurations may be used. The fins 36 may be broken into various portions around the circumference of the shank 40 forming groups of fins arranged along the longitudinal axis 44 of the shank.

The shank 40 further includes a stationary member 42 and a moveable member 50. The stationary member 42 is generally formed to extend substantially rigid between the first end 32 and second end 34. The stationary member 42 forms a portion of the shank 40 that is the structural backbone of the fastener 30, such that the shank 40 is substantially resistant to movement under normal operating conditions along a direction approximately perpendicular to the longitudinal axis 44 of the shank 40. The stationary member 42 may include at least one fin 36 for engagement against the first or lower surface 26 of the member 20 having the aperture 22. The stationary member 42 is connected to the first end or insertion end 32 of the shank 40 in an approximately rigid or, more preferably, substantially rigid connection. The stationary member 42 is configured to hold the first end 32 in place and more particularly to hold the tip 35 of the first end 32 in a desired orientation as the shank 40 is inserted. More specifically, the stationary member 42 is coupled to the first end 32, and specifically the tip 35, in a substantially rigid connection to ensure that the tip 35 does not bend or fold during insertion into the aperture 22. The substantially rigid member 42 is configured to maintain its shape and be substantially free from flexing to maintain the best balance between easy insertion and resistance to extraction, as well as maintaining a tight connection with the member 20 as any looseness or movement of the fastener may cause vibrations, wear and noise.

The moveable member 50 is also connected to the tip 35 or first end 32. As the tip 35 may be made in a variety of sizes, shapes, and configurations, it is expected that the connection illustrated in FIGS. 1-6 may vary, however, it is expected that the moveable member 50 will be coupled either directly to the stationary member 42 or indirectly to the stationary member 42 through the tip 35 by a connection that at least allows some movement of the moveable member 50 during insertion and when a removal force is applied. This movement is approximately perpendicular to the longitudinal axis 44 of the shank 40. More specifically, the moveable member 50 includes a fixed end 60 coupled to the tip 35 or stationary member 42 with a lower hinge 52. The moveable member 50 further includes a moveable end 62 in an opposing relationship to the fixed end 60. The moveable end 62 is generally configured to have the greatest range of movement of the moveable member 50.

The fastener 30 includes a connecting member or upper hinge 54 that extends between the stationary member 42 and moveable member 50. The connecting member 54 is generally configured to limit the range of movement inward toward the stationary member 42 as well as outward away from the stationary member 42. By limiting the range of movement of the moveable member 50, proper retention force is maintained such that the moveable member, particularly the moveable end 62, does not fold outwardly and allow the fastener to loosen within the aperture 22. The connecting member 54 also improves resistance to extraction by limiting deformation of the fastener 30 and thereby easy removal of the deformed fastener. The connecting member 54 is generally configured to flex at the ends 55.

The stationary member 42, moveable member 50, tip 35, and connecting member 54 define an elongated cavity 56. The elongated cavity 56 extends away from the tip 35 approximately parallel to either the moveable member 50 or stationary member 42. As the elongated cavity approaches the connecting member, it is extends outwardly forming a small angled cavity 58. More specifically, the small angled cavity 58 follows the connecting member 54 and extends toward a thin point 64 on the moveable member 50 away from the stationary member 42. The angled cavity 58 is configured to allow the movable member 50 to be forced toward the stationary member 42 during insertion. More specifically, the angled cavity 58 as illustrated in FIG. 4 decreases in size as the moveable member is forced into the angular cavity 58. Without the angular cavity 58, it would be more difficult to flex the movable member 50 toward the stationary member 42 as the angular cavity 58 allows for the deformation when combined with the thin point 64.

The moveable member 50, stationary member 42, and second end 34 define an open cavity 80. The open cavity 80 substantially angles outwardly away from the stationary member 44 following the connecting member 54 toward the second end 34. The open cavity 80 is also formed to allow the moveable member 50 to be displaced toward the stationary member 42. More specifically, the gap formed by the open cavity 80 provides space for the moveable member to move toward during insertion as illustrated in FIG. 4.

The moveable member 50 may also include fins 36 which are formed to engage the lower or first surface 26 of the member 20 having an aperture 22. Again, the fins 36 may be of any size, shape, or configuration. The upwardly extending fins 36 cause the moveable member 50, when the fastener 30 experiences a removal force along the longitudinal axis 44, to be formed outward. More specifically, the fins 36 are configured in conjunction with the connecting member 54 to allow the moveable member 50, specifically the moveable end 62, to substantially move outward thereby increasing the necessary force required to remove the fastener 30 from the aperture 22. More specifically, as the moveable member 50 moves outward away from the stationary member, the edge of the aperture 23 formed by the point between the first surface 26 and inner surface 24 intersecting is stationary and as the moveable member 50 moves outwardly the edge approaches the more rigid plastic on the moveable member. Therefore, the fins 36 engaging the first surface 26 are moved so that the extraction force increases as the moveable member moves outward. More specifically, the fins 36 are generally stronger proximate to the moveable member as compared to the outward edge 38 of the fins 36.

In operation the fastener 30 is inserted into the aperture 22 along the longitudinal axis 44 as illustrated in the partially inserted fastener 30 in FIG. 4. As the fastener is inserted the fins 36 may fold inward, and in addition, the moveable member 50 may move inward toward the stationary member 42. This inward movement of the moveable member 50 allows the fastener 30 to have a larger outer diameter or the fins 36 to have a larger outer diameter proportional to the inner diameter of the inner surface 24 of the aperture 22. The possible larger diameter of the shank 40 and larger diameter of the fins 36 helps improve the resistance of the fastener 30 to extraction. After components are attached to the fastener 30, any exerted removal force causes the outer edge 38 of the fins 36 to engage the lower surface 26 of the member 20. The normal shape and configuration of the fins provides an outward force that is transferred to the moveable member 50. The moveable member 50 in response to this force may move outwardly and in some cases partly downward as the connecting member 54 swings in an arcuate path outward and downward proportionally to the moveable member 50 moving outward away from the stationary member 42. The further the moveable member 50 moves outward, the greater the resistance to extraction. The connecting member 54 must be capable of pivoting at each end as well as the moveable member 50 must be capable of pivoting at the lower hinge. The movement of the moveable member 50 outwardly allows the fastener to fit within apertures having a larger manufacturing tolerance, which allows the fastener to maintain engagement across a greater range of manufacturing tolerances for the aperture than was previously possible with traditional fasteners.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A fastener comprising a first end and a second end and a shank having a longitudinal axis extending therebetween and wherein said shank has a stationary member and a moveable member coupled to said stationary member at said first end and with a single connecting member extending between said moveable member and said stationary member and wherein said connecting member is displaced from said first end and wherein said moveable member is capable of movement relative to said stationary member, and wherein each of said stationary member and said moveable member include a plurality of fins extending therefrom, and wherein said moveable member and said stationary member define an elongated cavity extending between said first end and said connecting member.

2. The fastener of claim 1 wherein said connecting member is secured to said stationary member and extends upwardly away from said stationary member to said moveable member, in the direction of said free end.

3. The fastener of claim 1 wherein said moveable member includes a shaft from which said fins extend and wherein said connecting member is secured to said stationary member and extends outward from said stationary member and toward said second end, said connecting member being secured to said moveable member proximate the place of least thickness of said shaft of said moveable member between the connecting member and the first end.

4. The fastener of claim 3 wherein said shaft of said moveable member includes an area of increased thickness between said first end and said free end.

5. The fastener of claim 3 wherein said stationary member includes a stationary shaft from which said fins extend and wherein said stationary shaft includes an area of reduced thickness proximate to said first end, and further defines in connection with said connecting member and said free end, an open cavity.

6. The fastener of claim 5 wherein said area of increased thickness on said shaft is longitudinally proximate to said area of reduced thickness on said stationary shaft.

7. The fastener of claim 1 wherein said connecting member is secured to said stationary member at a first distance from said first end and wherein said connecting member is secured to said moveable member at a second distance, said second distance being greater than said first distance.

8. The fastener of claim 1 wherein said elongated cavity includes an elongated section and an angled section.

9. The fastener of claim 8 wherein said moveable member includes a variable thickness and wherein said thickness is the smallest proximate said angled section.

10. The fastener of claim 1 wherein said moveable member has a normal position and is capable of being compressed from said normal position toward said stationary member during insertion and said moveable member is capable of substantially returning to said normal position after insertion.

11. The fastener of claim 1 wherein said moveable member is capable of being extended outwardly and being compressed inwardly relative to said stationary member.

12. The fastener of claim 1 wherein said movement is along a line approximately perpendicular to said longitudinal axis.

13. The fastener of claim 12 wherein said moveable member includes a free end and a fixed end and wherein said movement is greater proximate to said free end.

14. The fastener of claim 12 further including a connecting member extending between said moveable member and said stationary member, wherein said moveable member has a second greatest range of movement between said connecting member and said fixed end.

15. The fastener of claim 14 wherein said second greatest range of movement is proximate said connecting member.

16. A fastener comprising:
a first end and a second end;
a shank extending between said first end and said second ends, said shank having longitudinal axis, a stationary member including a stationary shaft and a plurality of fins extending therefrom, said stationary member extending substantially along said longitudinal axis, and a moveable member including a plurality of fins and wherein said moveable member is capable of movement relative to said stationary member, said moveable member being coupled to said first end and capable of movement relative to said stationary member and wherein said moveable member includes a free end located opposite said first end;
a single extending between said moveable member and said stationary member, said connecting member extending outward from said stationary member and toward said second end; and
an elongated cavity defined at least partially by said connecting member, said movable member and said stationary member.

17. The fastener of claim 16 wherein said elongated cavity includes an angled cavity proximate said connecting member.

18. The fastener of claim 17 wherein said angled cavity extends inward of said moveable member to create a thin point having the least thickness along the extent of said moveable member between said first end and said connecting member.

19. The fastener of claim 16 further including an open cavity at least partially formed by said stationary member, said second end, said moveable member and said connecting member.

20. A fastener comprising:
a stationary member having a first end and a second end and wherein said stationary member includes a stationary shaft coupled to a head assembly and a plurality of fins extending from said stationary shaft;
a moveable member coupled to said stationary member at said first end and wherein said moveable member includes a shaft with a plurality of fins extending therefrom and said shaft extends from said first end to a free end and wherein said moveable member is capable of being moved relative to said head assembly;
a connecting member extending between said moveable member and said stationary member and wherein said connecting member is coupled to said moveable member proximate to said free end and wherein said free end is configured to move relative to said second end and said stationary member; and
a cavity defined by said first end, stationary member, moveable member and said connecting member.

* * * * *

UNITED STATES PATENT AND TRADEMARK OFFICE
CERTIFICATE OF CORRECTION

| | | |
|---|---|---|
| PATENT NO. | : 7,891,926 B2 | Page 1 of 1 |
| APPLICATION NO. | : 12/020837 | |
| DATED | : February 22, 2011 | |
| INVENTOR(S) | : Nicholas Jackson, Jr. | |

It is certified that error appears in the above-identified patent and that said Letters Patent is hereby corrected as shown below:

In The Claims:

Column 6, Line 25, should read as follows: -- a single connecting member extending between said moveable member and --

Signed and Sealed this
Fifth Day of April, 2011

David J. Kappos
*Director of the United States Patent and Trademark Office*